(12) United States Patent
Uno

(10) Patent No.: US 11,884,034 B2
(45) Date of Patent: Jan. 30, 2024

(54) TIRE MOLD, PRODUCTION METHOD FOR TIRE, AND TIRE

(71) Applicant: Sumitomo Rubber Industries, Ltd., Kobe (JP)

(72) Inventor: Hiroki Uno, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 378 days.

(21) Appl. No.: 17/155,088

(22) Filed: Jan. 22, 2021

(65) Prior Publication Data

US 2021/0229383 A1    Jul. 29, 2021

(30) Foreign Application Priority Data

Jan. 23, 2020    (JP) ................. 2020-009230

(51) Int. Cl.
*B29D 30/06*    (2006.01)

(52) U.S. Cl.
CPC .. *B29D 30/0606* (2013.01); *B29D 2030/0612* (2013.01)

(58) Field of Classification Search
CPC ............. B29D 30/06; B29D 2030/0612; B29D 30/66; B60C 11/1376; B60C 11/0083; B60C 11/1392; B60C 2011/0344
See application file for complete search history.

(56) References Cited

U.S. PATENT DOCUMENTS

| | | | |
|---|---|---|---|
| 2016/0151988 A1* | 6/2016 | Gaebelein | B22D 19/0072 219/121.72 |
| 2021/0122195 A1* | 4/2021 | Tomomatsu | B60C 11/0302 |

FOREIGN PATENT DOCUMENTS

JP    2014-61602 A    4/2014

* cited by examiner

*Primary Examiner* — Francisco W Tschen
*Assistant Examiner* — Elisa H Vera
(74) *Attorney, Agent, or Firm* — XSENSUS LLP

(57) ABSTRACT

In a tread-forming surface of a mold, a contour of a land surface-forming portion located between two projections among at least three land surface-forming portions can be represented by a single circular arc that is convex outward. In a case where, of the two projections, one projection is a wide projection and the other projection is a narrow projection, when a surface that has a contour represented by at least one circular arc and that is tangent to the at least three land surface-forming portions is defined as a reference surface of the tread-forming surface, a drop distance from the reference surface to an end on the wide projection side of the land surface-forming portion can be longer than a drop distance from the reference surface to an end on the narrow projection side of the land surface-forming portion.

11 Claims, 10 Drawing Sheets

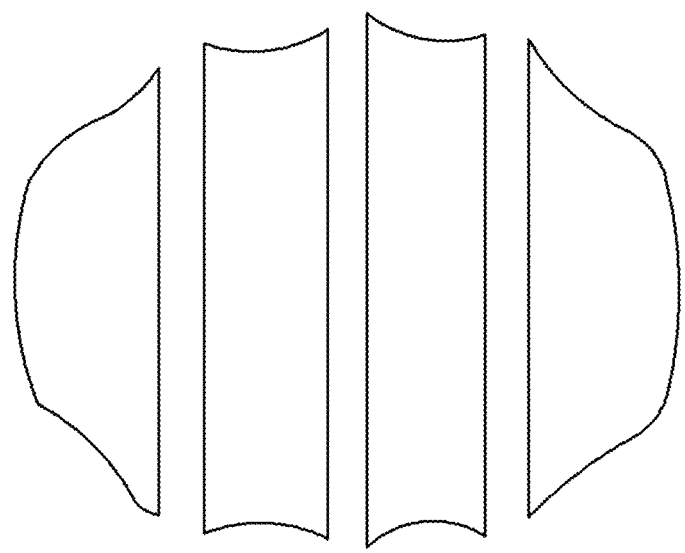
FIG. 9
Conventional

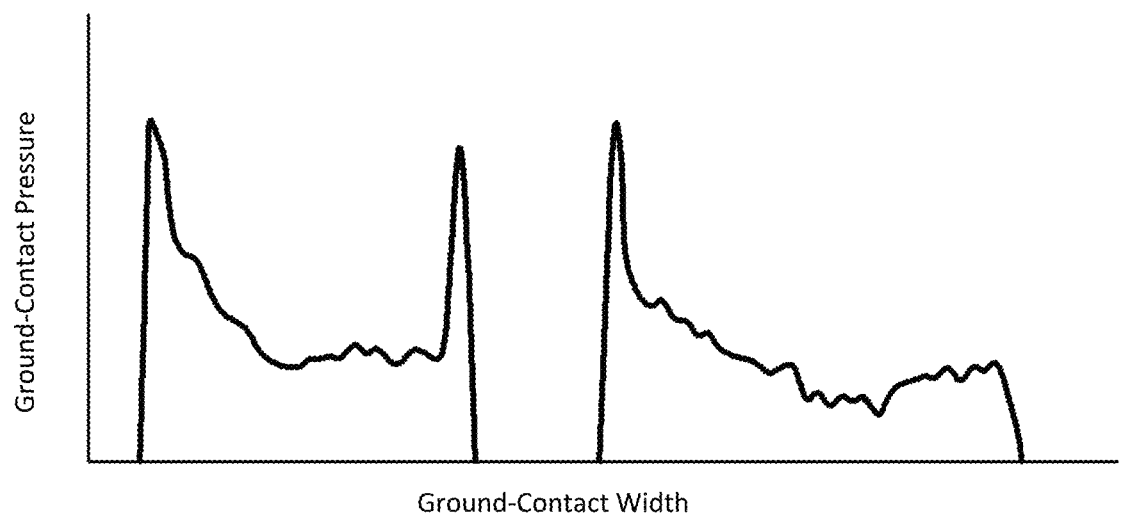
FIG. 10
Conventional

TIRE MOLD, PRODUCTION METHOD FOR TIRE, AND TIRE

CROSS REFERENCE TO RELATED APPLICATION

The present application claims priority to Japanese patent application JP 2020-009230, filed on Jan. 23, 2020, the entire contents of which is incorporated herein by reference in its entirety.

BACKGROUND

Technical Field

The present disclosure relates a tire mold, a production method for a tire, and a tire.

Description of the Background Art

A tire can be obtained by pressurizing and heating a tire in an uncrosslinked state (hereinafter, green tire) within a mold. A plurality of circumferential grooves may be formed on the tread of the tire so as to be aligned in the axial direction, whereby land portions can be formed therein. In order to form the circumferential grooves, projections corresponding to the circumferential grooves can be provided on a tread-forming surface of the mold. By pressing the green tire against the projections, the circumferential grooves can be formed on the tread.

The tire may include, for example, a belt including a relatively large number of aligned cords, on the radially inner side of the tread. Various measures have been taken in the production of tires such that the belt does not become wavy as a result of pressing the green tire against the projections (for example, Japanese Laid-Open Patent Publication No. 2014-61602).

When the green tire is pressed against the projections, a part of a rubber composition in an unvulcanized state (hereinafter, unvulcanized rubber) pressed by the projections can flow into portions where the land portions are to be formed. At this time, if the unvulcanized rubber does not flow easily, disturbance may occur in the inner surface shape of the tread. In particular, in the case of forming a wide circumferential groove having a groove width of not less than 9 mm on the tread, the volume of the unvulcanized rubber pressed against the projection can be relatively large, so that it may be difficult to control the thickness of the tread, and the belt may become wavy.

FIG. 9 shows a ground-contact surface shape of a tire (size=205/55R16) in which disturbance has occurred in the inner surface shape of a tread. FIG. 9 shows the contour of each land portion included in the ground-contact surface. FIG. 10 shows a ground-contact pressure distribution of the tire. In FIG. 10, the right side shows a ground-contact pressure distribution of a shoulder land portion, and the left side shows a ground-contact pressure distribution of a middle land portion.

As shown in FIG. 9, in the ground-contact surface shape, the outer edge in the circumferential direction (north-south in FIG. 9) of each land portion has a shape that is convex inward. As shown in FIG. 10, it is confirmed that the ground-contact pressure is locally increased at the edge of each land portion. Specifically, a ground-contact pressure difference of about 200 kPa is confirmed in the middle land portion, and a ground-contact pressure difference of about 250 kPa is confirmed in the shoulder land portion. The disturbance in the inner surface shape of the tread influences the ground-contact surface shape and the ground-contact pressure distribution of the tire. In other words, if the disturbance in the inner surface shape of the tread in the tire can be suppressed, the tire can be more sufficiently brought into contact with a road surface, so that it is expected that steering stability can be further improved. In this case, a local increase in ground-contact pressure also can be suppressed, so that it is also expected that wear resistance can be improved.

The present disclosure has been made in view of the above and other circumstances, and an aspect of the present disclosure is to provide a tire mold and a production method for a tire that are capable of making a ground-contact surface shape and a ground-contact pressure distribution appropriate, and a tire having a ground-contact surface shape and a ground-contact pressure distribution that are made appropriate.

SUMMARY

A tire mold according to an aspect of the present disclosure is a mold to produce a tire including a tread having a tread surface that comes into contact with a road surface, at least two circumferential grooves that can have a groove width of not less than 9 mm being formed on the tread so as to extend in a circumferential direction, thereby forming at least three land portions in the tread, the tread surface including the at least two circumferential grooves and at least three land surfaces that are outer surfaces of the at least three land portions, the tire mold including a tread-forming surface to shape the tread surface. The tread-forming surface can include at least two projections to form the at least two circumferential grooves, and at least three land surface-forming portions to form the at least three land surfaces. A contour of a land surface-forming portion located between two projections among the at least three land surface-forming portions can be represented by a single circular arc that is convex outward. In a case where, of the two projections, one projection is a wide projection having a larger width than the other projection, and the other projection is a narrow projection having a smaller width than the one projection, when a surface that has a contour represented by at least one circular arc and that is tangent to the at least three land surface-forming portions is defined as a reference surface of the tread-forming surface, a wide-side drop distance MDW that is a distance from the reference surface of the tread-forming surface to an end on a wide projection side of the land surface-forming portion can be longer than a narrow-side drop distance MDN that is a distance from the reference surface of the tread-forming surface to an end on a narrow projection side of the land surface-forming portion.

A tire mold according to an aspect of the present disclosure is a mold to produce a tire including a tread having a tread surface that comes into contact with a road surface, at least two circumferential grooves that can have a groove width of not less than 9 mm being formed on the tread so as to extend in a circumferential direction, thereby forming at least three land portions in the tread, the tread surface including the at least two circumferential grooves and at least three land surfaces that are outer surfaces of the at least three land portions, the tire mold including a tread-forming surface to shape the tread surface. The tread-forming surface can include at least two projections to form the at least two circumferential grooves, and at least three land surface-forming portions to form the at least three land surfaces. Among the at least three land surface-forming portions, a land surface-forming portion located on each outer side in an axial direction can be a shoulder land surface-forming portion, a land surface-forming portion located inward of the shoulder land surface-forming portion can be a middle land surface-forming portion, and a projection between the shoulder land surface-forming portion and the middle land surface-forming portion can be a shoulder projection. When a surface that has a contour represented by at least one circular arc and that is tangent to the at least three land surface-forming portions is defined as a reference surface of the tread-forming surface, and a tangent point between one of the shoulder land surface-forming portions and the reference surface of the tread-forming surface on the shoulder projection side is defined as a reference position, a contour of a portion from an end on the shoulder projection side of the shoulder land surface-forming portion to the reference position can be represented by a single circular arc.

BRIEF DESCRIPTION OF THE DRAWINGS

FIG. 9 is a schematic diagram showing an example of a ground-contact surface shape of a tire produced by a conventional mold; and FIG. 10 is a graph showing an example of a ground-contact pressure distribution of the tire produced by the conventional mold.

DETAILED DESCRIPTION

Hereinafter, the present disclosure will be described in detail based on exemplary embodiments with appropriate reference to the drawings.

In the present disclosure, a state where a tire is mounted on a normal rim, the internal pressure of the tire is adjusted to a normal internal pressure, and no load is applied to the tire is referred to as a normal state. In the present disclosure, unless otherwise specified, the dimensions and angles of each component of the tire are measured in the normal state.

The normal rim can mean a rim specified in a standard on which the tire is based. The "standard rim" in the JATMA standard, the "Design Rim" in the TRA standard, and the "Measuring Rim" in the ETRTO standard are examples of normal rims.

The normal internal pressure can mean an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are examples of normal internal pressures. The normal internal pressure of a tire for a passenger car can be, for example, 180 kPa.

A normal load can mean a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are examples of normal loads. The normal load of a tire for a passenger car can be, for example, a load corresponding to 88% of the above load.

Figure 1:
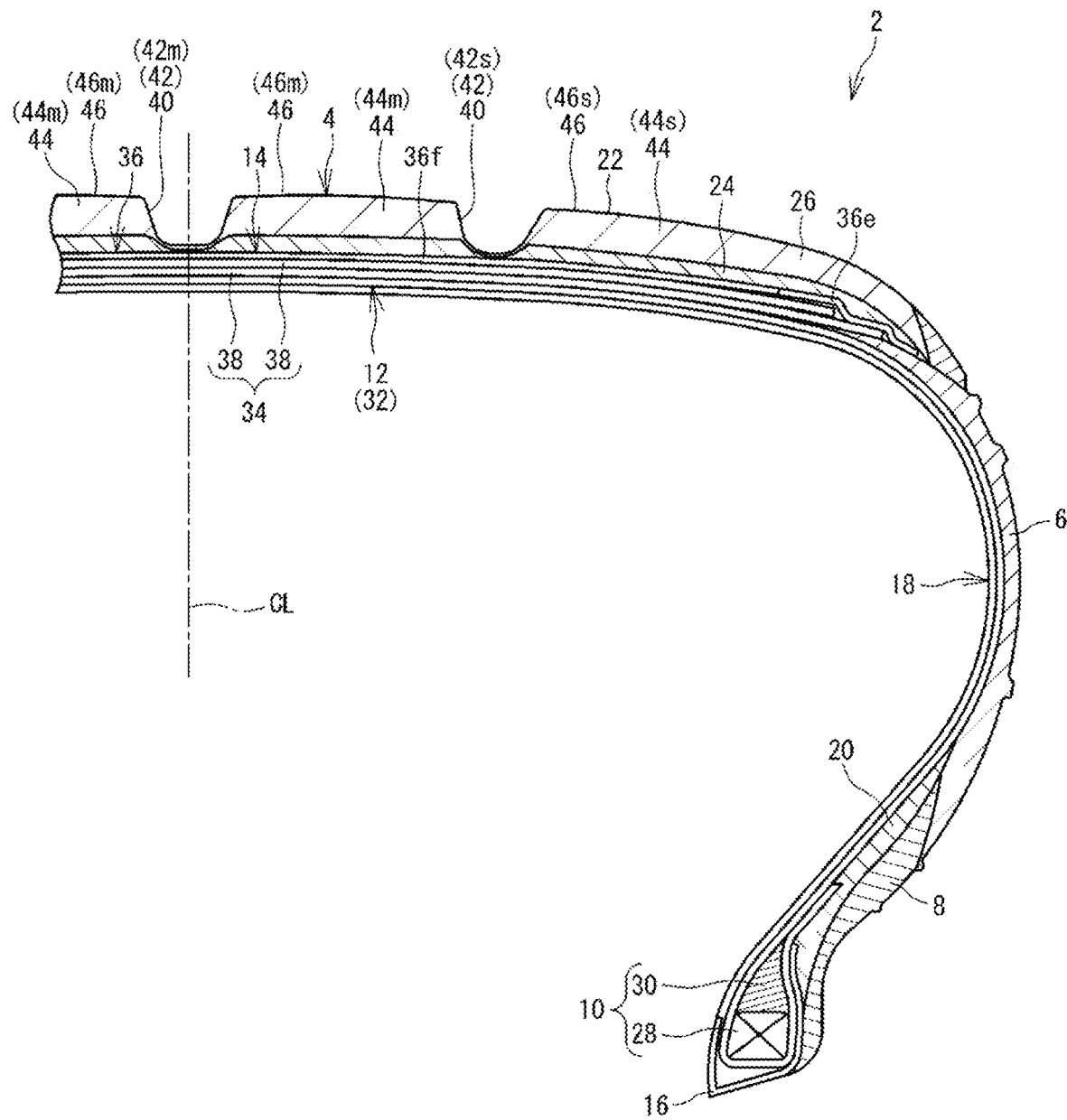
FIG. 1 is a cross-sectional view showing a part of a pneumatic tire according to an embodiment of the present disclosure.

FIG. 1 shows a part of a pneumatic tire 2 (hereinafter, sometimes referred to simply as "tire 2") according to an embodiment of the present disclosure. The tire 2 can be mounted to a passenger car, for instance.

FIG. 1 shows a part of a cross-section of the tire 2 along a plane including the rotation axis of the tire 2. In FIG. 1, the right-left direction is the axial direction of the tire 2, and the up-down direction is the radial direction of the tire 2. The direction perpendicular to the surface of the sheet of FIG. 1 is the circumferential direction of the tire 2. In FIG. 1, an alternate long and short dash line CL represents the equator plane of the tire 2.

The tire 2 includes a tread 4, a pair of sidewalls 6, a pair of clinches 8, a pair of beads 10, a carcass 12, a cord reinforcing layer 14, a pair of chafers 16, an inner liner 18, and a pair of rubber reinforcing layers 20.

A part of the outer surface of the tread 4 comes into contact with a road surface. The tread 4 has a tread surface 22 that comes into contact with a road surface. The tread 4 is located outward of the cord reinforcing layer 14 in the radial direction.

The tread 4 can include a base portion 24 and a cap portion 26. The base portion 24 forms a radially inner portion of the tread 4. The base portion 24 is formed from a crosslinked rubber for which heat generation properties are taken into consideration. The cap portion 26 is located radially outward of the base portion 24. In the tire 2, the cap portion 26 comes into contact with the road surface. The outer surface of the cap portion 26 includes the above-described tread surface 22. The cap portion 26 is formed from a crosslinked rubber for which wear resistance and grip performance are taken into consideration. The tread 4 may be composed of only the cap portion 26.

Each sidewall 6 extends from an end of the tread 4 inwardly in the radial direction along the carcass 12. The sidewall 6 is formed from a crosslinked rubber.

Each clinch 8 is located radially inward of the sidewall 6. The clinch 8 can come into contact with a rim. The clinch 8 is formed from a crosslinked rubber for which wear resistance is taken into consideration.

Each bead 10 is located axially inward of the clinch 8. The bead 10 includes a core 28 and an apex 30. The core 28 includes a wire made of steel. The apex 30 is located radially outward of the core 28. The apex 30 is formed from a crosslinked rubber that has high stiffness. As shown in FIG. 1, the size of the apex 30 can be smaller than that of a conventional apex.

The core 28 may include two cores aligned in the axial direction. In this case, a later-described carcass ply may not be turned up around the core 28, but an end portion of the carcass ply can be interposed between these two cores.

The carcass 12 is located inward of the tread 4, the pair of sidewalls 6, and the pair of clinches 8. The carcass 12 extends on and between one bead 10 and the other bead 10. The carcass 12 has a radial structure. The carcass 12 includes at least one carcass ply 32. The carcass 12 of the tire 2 is composed of one carcass ply 32. The carcass ply 32 is turned up around the core 28 of each bead 10. The carcass ply 32 can include a relatively large number of cords aligned with each other.

The cord reinforcing layer 14 can include a belt 34 and a band 36. The belt 34 forms an inner portion of the cord reinforcing layer 14, and the band 36 forms an outer portion of the cord reinforcing layer 14. The cord reinforcing layer 14 may be composed of only the belt 34, or may be composed of only the band 36.

The belt 34 is laminated on the carcass 12 on the radially inner side of the tread 4. The belt 34 includes at least two belt plies 38 laminated in the radial direction. The belt 34 of the tire 2 is composed of two belt plies 38. Each of the two belt plies 38 includes a relatively large number of cords aligned with each other. These cords are inclined relative to the equator plane CL. The material of each cord is steel.

The band 36 is located inward of the tread 4 in the radial direction. The band 36 is located between the tread 4 and the belt 34 in the radial direction. The band 36 of the tire 2 includes a full band 36f and a pair of edge bands 36e located outward of the full band 36f. The band 36 may be composed of only the full band 36f, or may be composed of only the pair of edge bands 36e.

The band 36 can include cords. In the full band 36f and the edge bands 36e, the cords can be spirally wound in the circumferential direction. A cord formed from an organic fiber is used as each cord of the band 36.

Each chafer 16 is located radially inward of the bead 10. The chafer 16 can come into contact with the rim. The chafer 16 includes a fabric and a rubber with which the fabric is impregnated. The chafer 16 may be composed of a member formed from a crosslinked rubber.

The inner liner 18 is located inward of the carcass 12. The inner liner 18 forms an inner surface of the tire 2. The inner liner 18 is formed from a crosslinked rubber that has low gas permeability.

Each rubber reinforcing layer 20 is located outward of the apex 30 in the axial direction. The rubber reinforcing layer 20 is located between the carcass 12 and the clinch 8. The rubber reinforcing layer 20 is formed from a crosslinked rubber. In the tire 2, the material of the rubber reinforcing layer 20 is the same as that of the apex 30. In the tire 2, the rubber reinforcing layer 20 does not have to be provided. In this case, an apex other than apex 30 may be adopted.

As shown in FIG. 1, grooves 40 are formed on the tread 4 of the tire 2 (specifically, the cap portion 26). Accordingly, a tread pattern is formed. Each groove 42 of the tire 2 shown in FIG. 1 is a part of the grooves 40 which form the tread pattern. The groove 42 extends in the circumferential direction. The groove 42 is a circumferential groove. The circumferential groove 42 can have a groove width of not less than 9 mm and not greater than 20 mm, which can be set as appropriate in accordance with the specifications of the tire 2. The circumferential groove 42 can have a groove depth of not less than 5 mm and not greater than 15 mm. The groove width is represented as the distance from one edge of the groove 40 to the other edge of the groove 40. The groove depth is represented as the distance from the edge to the bottom. In the case where the edges are rounded, a groove width and a groove depth are specified on the basis of virtual edges obtained on the assumption that the edges are not rounded.

FIG. 1 shows an example in which a plurality of circumferential grooves 42 formed on the tread 4 are arranged symmetrically with respect to the equator plane CL. However, in the tire 2, these circumferential grooves 42 may be arranged asymmetrically with respect to the equator plane CL.

At least two circumferential grooves 42 each having a groove width of not less than 9 mm can be formed on the tread 4 of the tire 2. Accordingly, at least three land portions 44 can be formed. In the tire 2, each circumferential groove 42 is a part of the tread surface 22. The tread surface 22 includes the at least two circumferential grooves 42 and at least three land surfaces 46 that are the outer surfaces of the at least three land portions 44.

Figure 2:
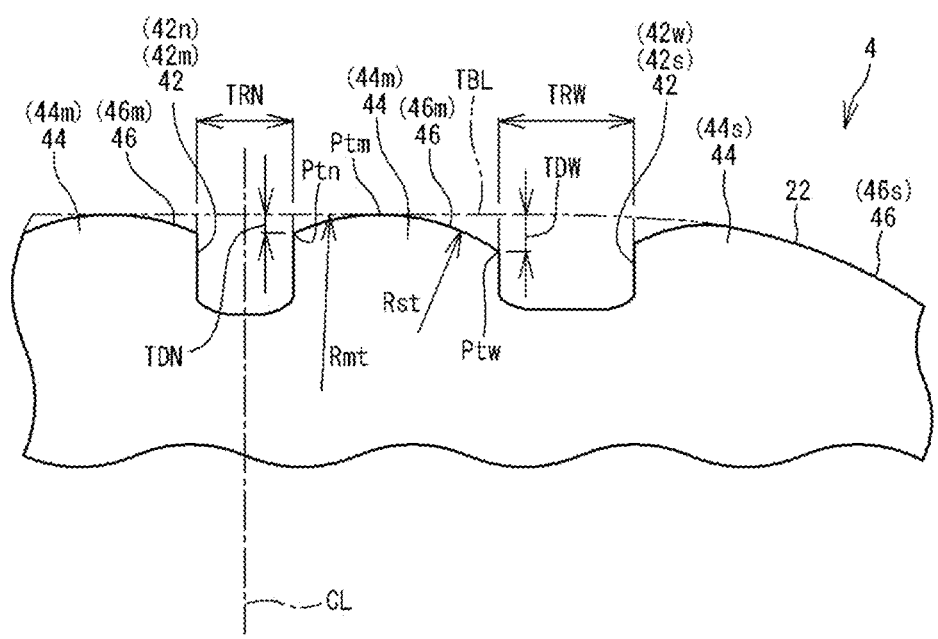
FIG. 2 is a cross-sectional view showing a part of the tire shown in FIG. 1.

FIG. 2 shows a part of the tread 4 shown in FIG. 1. In FIG. 2, the contour of the tread surface 22 is schematically represented. In FIG. 2, the right-left direction is the axial direction of the tire 2, and the up-down direction is the radial direction of the tire 2. The direction perpendicular to the surface of the sheet of FIG. 2 is the circumferential direction of the tire 2.

A plurality of circumferential grooves 42 (e.g., three) can be formed on the tread 4 of the tire 2 so as to be aligned in the axial direction. Among these circumferential grooves 42, a circumferential groove 42s located on each outer side in the axial direction can be a shoulder circumferential groove. A circumferential groove 42m located inward of the shoulder circumferential groove 42s in the axial direction can be a middle circumferential groove. In the tire 2, the middle circumferential groove 42m can be located on the equator plane CL, and thus may also be referred to as crown circumferential groove.

In the tire 2, the aforementioned three circumferential grooves 42 can be formed on the tread 4 so as to be aligned in the axial direction, thereby forming four land portions 44. Among these four land portions 44, a land portion 44s located on each outer side in the axial direction can be a shoulder land portion. The outer surface of the shoulder land portion 44s (that is, a land surface 46s) can be a shoulder land surface. A land portion 44m located inward of the shoulder land portion 44s in the axial direction is a middle land portion. The outer surface of the middle land portion 44m (that is, a land surface 46m) can be a middle land surface. In the tire 2, the right and left middle land portions 44m can be located at a center portion of the tread 4 and thus may also be referred to as crown land portions.

In the tread surface 22 of the tire 2, the circumferential groove 42 between each shoulder land surface 46s and each middle land surface 46m can be the shoulder circumferential groove 42s, and the circumferential groove 42 between the right and left middle land surfaces 46m can be the middle circumferential groove 42m.

In the tire 2, each shoulder circumferential groove 42s can have a depth substantially equal to the groove depth of the middle circumferential groove 42m. In the tire 2, the shoulder circumferential groove 42s may be shallower than the middle circumferential groove 42m, or the middle circumferential groove 42m may be shallower than the shoulder circumferential groove 42s. As for when two circumferential grooves 42 are compared with each other, in the case where the ratio of the groove depth of one circumferential groove 42 to the groove depth of the other circumferential groove 42 is not less than 0.9 and not greater than 1.1, it is determined that the two circumferential grooves 42 have groove depths substantially equal to each other.

In the tire 2, the groove width of the shoulder circumferential groove 42s can be larger than the groove width of the middle circumferential groove 42m. The shoulder circumferential groove 42s may also be referred to as wide circumferential groove 42w, and the middle circumferential groove 42m may also be referred to as narrow circumferential groove 42n. In the tire 2, the groove width of the middle circumferential groove 42m may be larger than the groove width of the shoulder circumferential groove 42s. In this case, the middle circumferential groove 42m may also be referred to as wide circumferential groove 42w, and the shoulder circumferential groove 42s may also be referred to as narrow circumferential groove 42n. In the case where the difference between the groove width of one circumferential groove 42 and the groove width of another circumferential groove 42 is not less than −0.03 mm and not greater than 0.03 mm, it is determined that the two circumferential grooves 42 have groove widths substantially equal to each other.

In FIG. 2, an alternate long and two short dashes line TBL represents a reference surface of the tread surface 22. The reference surface TBL of the tread surface 22 represents a virtual tread surface obtained on the assumption that the grooves 40 are not present on the tread 4. In the tire 2, a surface that has a contour represented by at least one circular arc and that is tangent to the at least three land surfaces 46 is the reference surface TBL of the tread surface 22. In the case where the contour of the reference surface TBL is represented by a plurality of circular arcs aligned in the axial direction, the contour of the reference surface TBL can be formed such that: one circular arc and another circular arc located adjacent to the one circular arc are tangent to each other at the boundary between both circular arcs; and a circular arc located on the inner side in the axial direction has a radius larger than that of the circular arc located on the outer side. In this case, one circular arc and another circular arc may be connected by a straight line that is tangent to both circular arcs.

A state where the tire 2 is mounted on the normal rim, the internal pressure of the tire 2 is adjusted to 5% of the normal internal pressure, and no load is applied to the tire 2 is referred to as a reference state. The contour of the tread surface 22 of the tire 2 is represented by the contour of the tread surface 22 in the reference state, or the contour of a tread-forming surface of a later-described tire mold. In the case where the contour configuration of the tread surface 22 is not clear, the contour of the reference surface TBL of the tread surface 22 may be specified, for example, on the basis of a contour of the tread surface 22 that is obtained by analyzing cross-section image data of the tire 2 in the reference state taken by a computer tomography method using X-rays (hereinafter, X-ray CT method) or shape data of the tread surface 22 of the tire 2 in the reference state measured using a profile measuring device (not shown) having a laser displacement meter. In this case, the contour of the reference surface TBL of the tread surface 22 can be represented by a single circular arc that is tangent to the three land surfaces 46 aligned in the axial direction.

The tire 2 described above can be produced as follows. Generally, a rubber composition in an unvulcanized state (hereinafter, also referred to as an unvulcanized rubber) for components included in the tire 2 such as the tread 4, the sidewalls 6, and the beads 10 is prepared in the production of the tire 2. The unvulcanized rubber is obtained by mixing a base rubber and chemicals using a kneading machine (not shown) such as a Banbury mixer.

Examples of the base rubber include natural rubber (NR), butadiene rubber (BR), styrene-butadiene rubber (SBR), isoprene rubber (IR), ethylene-propylene rubber (EPDM), chloroprene rubber (CR), acrylonitrile-butadiene rubber (NBR), and isobutylene-isoprene-rubber (IIR). Examples of the chemicals include reinforcing agents such as carbon black and silica, plasticizers such as aromatic oil, fillers such as zinc oxide, lubricants such as stearic acid, antioxidants, processing aids, sulfur, and vulcanization accelerators. Selection of a base rubber and chemicals, the amounts of the selected chemicals, etc., are determined as appropriate in accordance with the specifications of a component for which the rubber is used.

In the production of the tire 2, in a rubber molding machine such as an extruder, the shape of the unvulcanized rubber is adjusted to prepare preforms for tire components. In a tire shaping machine (not shown), the preforms for the tread 4, the sidewalls 6, the bead 10, etc., are combined to prepare the tire 2 in an unvulcanized state (hereinafter, also referred to as green tire).

In the production of the tire 2, the green tire is put into a mold of a vulcanizing machine (not shown). The green tire is pressurized and heated within the mold to obtain the tire 2. The tire 2 is a vulcanized-molded product of the green tire.

The production method for the tire 2 includes a step of preparing a green tire, and a step of pressurizing and heating the green tire using a mold. Although not described in detail, in the production of the tire 2, the vulcanization conditions such as temperature, pressure, and time are not particularly limited, and general vulcanization conditions are adopted.

Figure 3:
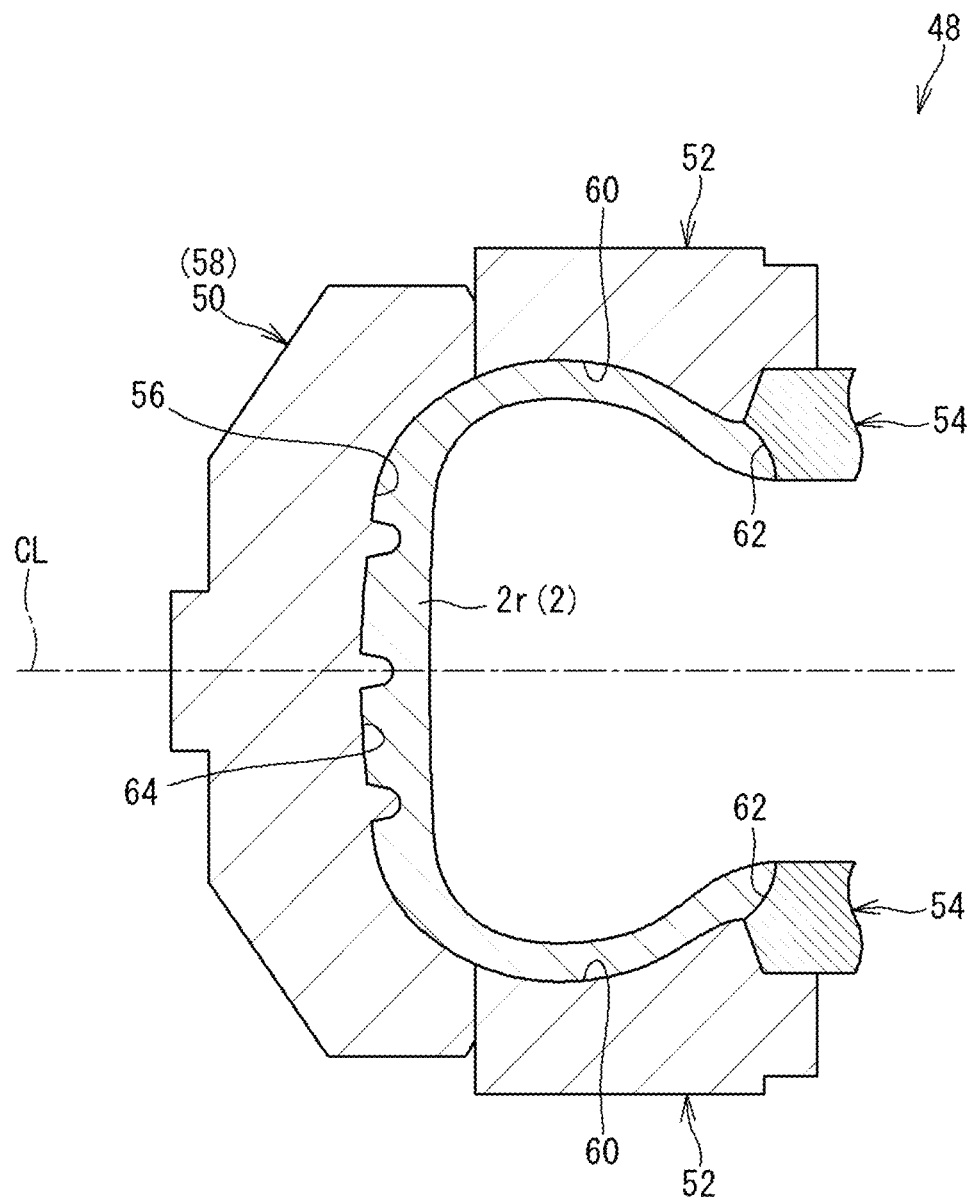
FIG. 3 is a cross-sectional view showing a part of a tire mold according to an embodiment of the present disclosure.

FIG. 3 shows a part of a cross-section of an exemplary tire mold 48 along a plane including the rotation axis of the tire 2 according to one or more embodiments of the present disclosure. In FIG. 3, the right-left direction is the radial direction of the tire 2, and the up-down direction is the axial direction of the tire 2. The direction perpendicular to the surface of the sheet of FIG. 3 is the circumferential direction of the tire 2. An alternate long and short dash line CL represents the equator plane of the tire 2. For convenience of description, the dimensions of the tire mold 48 are represented below on the basis of the dimensions of the tire 2.

The tire mold 48 can include a tread ring 50, a pair of side plates 52, and a pair of bead rings 54. In FIG. 3, the tire mold 48 is in a state where the tread ring 50, the pair of side plates 52, and the pair of bead rings 54 are combined, that is, in a closed state. The tire mold 48 can be a segmented mold.

The tread ring 50 forms a radially outer portion of the tire mold 48. The tread ring 50 has a tread-forming surface 56 in the inner surface thereof. The tread-forming surface 56 shapes the tread surface 22 of the tire 2. The tread ring 50 of the tire mold 48 includes a relatively large number of segments 58. These segments 58 are arranged in a ring shape.

Each side plate 52 is located radially inward of the tread ring 50. The side plate 52 is connected to an end of the tread ring 50. The side plate 52 has a sidewall-forming surface 60 in the inner surface thereof. The sidewall-forming surface 60 shapes a side surface of the tire 2.

Each bead ring 54 is located radially inward of the side plate 52. The bead ring 54 is connected to an end of the side plate 52. The bead ring 54 has a bead-forming surface 62 in the inner surface thereof. The bead-forming surface 62 shapes the bead 10 portion of the tire 2, specifically, a portion to be fitted to the rim.

In the tire mold 48, a cavity face 64 for shaping the outer surface of the tire 2 is formed by combining the large number of segments 58, the pair of side plates 52, and the pair of bead rings 54. The cavity face 64 includes the tread-forming surface 56, a pair of the sidewall-forming surfaces 60, and a pair of the bead-forming surfaces 62.

In a pressurizing and heating step, a green tire 2r is pressed against the cavity face 64 of the tire mold 48 by a rigid core or an expanded bladder. Accordingly, the outer surface of the tire 2 is shaped.

Figure 4:
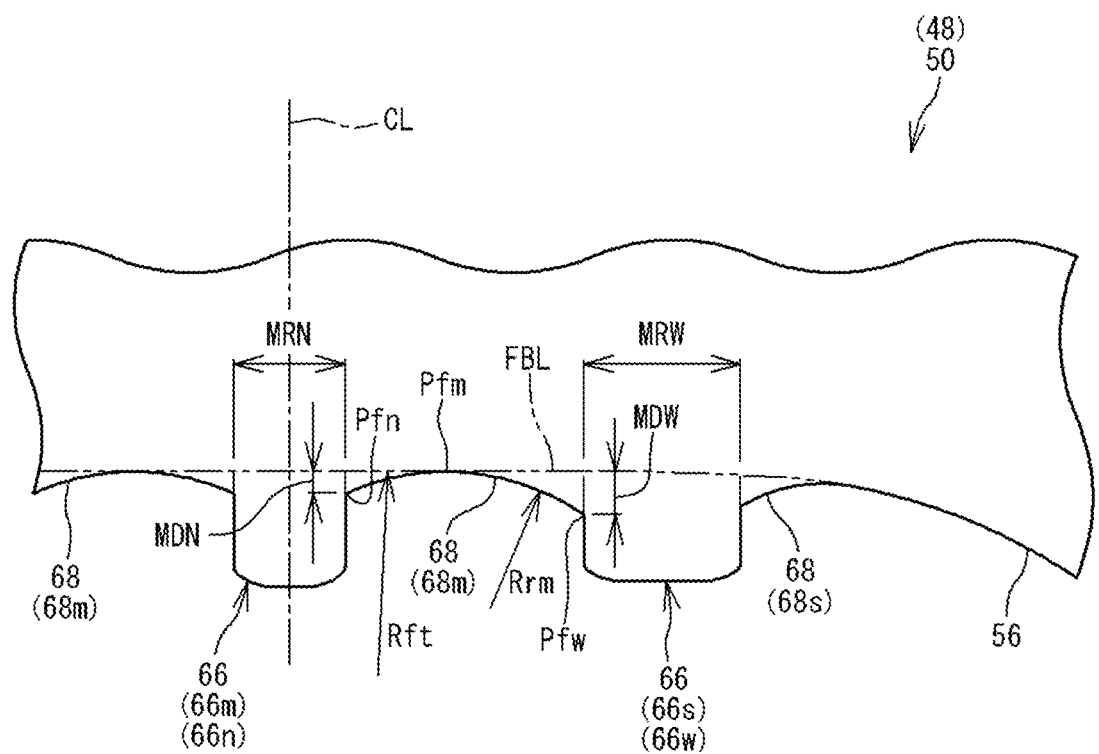
FIG. 4 is a cross-sectional view showing a part of the tire mold shown in FIG. 3.

FIG. 4 shows a cross-section of the tread ring 50 which forms a part of the tire mold 48 shown in FIG. 3. In FIG. 4, the contour of the tread-forming surface 56 for shaping the tread surface 22 is schematically represented. In FIG. 4, the right-left direction is the axial direction of the tire 2, and the up-down direction is the radial direction of the tire 2. The direction perpendicular to the surface of the sheet of FIG. 4 is the circumferential direction of the tire 2.

As described above, the tread surface 22 of the tire 2 includes the at least two circumferential grooves 42 and the at least three land surfaces 46 which are the outer surfaces of the at least three land portions 44. Therefore, in the tire mold 48, the tread-forming surface 56 for shaping the tread surface 22 can include at least two projections 66 for forming the at least two circumferential grooves 42, and at least three land surface-forming portions 68 for forming the at least three land surfaces 46.

The tread-forming surface 56 shown in FIG. 4 can include a plurality of projections 66 (e.g., three) and a plurality of land surface-forming portions 68 (e.g., four). Among the three projections 66, a projection 66s located on each outer side in the axial direction can be a shoulder projection. The shoulder projection 66s forms the shoulder circumferential groove 42s of the tire 2. A projection 66m located inward of the shoulder projection 66s in the axial direction can be a middle projection. The middle projection 66m forms the middle circumferential groove 42m of the tire 2. Among the four land surface-forming portions 68, a land surface-forming portion 68 located on each outer side in the axial direction can be a shoulder land surface-forming portion. The shoulder land surface-forming portion 68s forms the shoulder land surface 46s of the tire 2. A land surface-forming portion 68m located inward of the shoulder land surface-forming portion 68s in the axial direction can be a middle land surface-forming portion. The middle land surface-forming portion 68m forms the middle land surface 46m of the tire 2.

In the tread-forming surface 56 of the mold 48, the projection 66 between each shoulder land surface-forming portion 68s and each middle land surface-forming portion 68m can be the shoulder projection 66s, and the projection 66 between the right and left middle land surface-forming portions 68m can be the middle projection 66m. As described above, the groove width of each shoulder circumferential groove 42s can be larger than the groove width of the middle circumferential groove 42m. In the tire mold 48, the width of each shoulder projection 66s for forming the shoulder circumferential groove 42s can be larger than the width of the middle projection 66m for forming the middle circumferential groove 42m. The shoulder projection 66s may also be referred to as wide projection 66w, and the middle projection 66m may also be referred to as narrow projection 66n.

In the tire mold 48, the flow of the unvulcanized rubber that is generated by pressing the projections 66 against the green tire 2r is controlled on the basis of the shapes of the land surface-forming portions 68. As described above, the circumferential grooves 42 are formed on the cap portion 26 of the tread 4. The projections 66 on the tread-forming surface 56 press the cap portion 26. In the tire mold 48, the flow of the unvulcanized rubber, for the cap portion 26, generated by pressing the projections 66 against the green tire 2r is controlled on the basis of the shapes of the land surface-forming portions 68. Hereinafter, the shapes of the land surface-forming portions 68 will be described.

In FIG. 4, an alternate long and two short dashes line FBL represents a reference surface of the tread-forming surface 56. The reference surface FBL of the tread-forming surface 56 corresponds to the above-described reference surface TBL of the tread surface 22. In the tire mold 48, a surface that has a contour represented by at least one circular arc and that is tangent to the at least three land surface-forming portions 68 is the reference surface FBL of the tread-forming surface 56. In the case where the contour of the reference surface FBL is represented by a plurality of circular arcs aligned in the axial direction, the contour of the reference surface FBL can be formed such that: one circular arc and another circular arc located adjacent to the one circular arc are tangent to each other at the boundary between both circular arcs; and a circular arc located on the inner side in the axial direction has a radius larger than that of the circular arc located on the outer side.

[Contour of Land Surface-Forming Portion 68 Located Between Two Projections 66]

The contour of the land surface-forming portion 68 located between two projections 66 will be described on the basis of the contour of the middle land surface-forming portion 68m shown in FIG. 4. The middle land surface-forming portion 68m is located between the shoulder projection 66s and the middle projection 66m. As described above, the shoulder projection 66s can be the wide projection 66w, and the middle projection 66m can be the narrow projection 66n. The middle land surface-forming portion 68m can be the land surface-forming portion 68 located between the wide projection 66w and the narrow projection 66n.

As described above, the reference surface FBL of the tread-forming surface 56 is tangent to the at least three land surface-forming portions 68 included in the tread-forming surface 56. In FIG. 4, reference character Pfm represents the tangent point between the reference surface FBL of the tread-forming surface 56 and the land surface-forming portion 68. Reference character Pfn represents the end on the narrow projection 66n side of the land surface-forming portion 68. The end Pfn is the boundary between the land surface-forming portion 68 and the outer surface of the narrow projection 66n. Reference character Pfw represents the end on the wide projection 66w side of the land surface-forming portion 68. The end Pfw is the boundary between the land surface-forming portion 68 and the wide projection 66w.

In the tire mold 48, the contour of the land surface-forming portion 68 is represented by a single circular arc that is convex outward. In FIG. 4, an arrow Rrm represents the radius of the circular arc that represents the contour of the land surface-forming portion 68. In the case where the contour configuration of the land surface-forming portion 68 is not clear, when a circular arc passing through the boundary Pfn, the tangent point Pfm, and the boundary Pfw is drawn and the maximum value of the distance between this circular arc and the contour is not greater than 0.03 mm, it is determined that the contour of the land surface-forming portion 68 is represented by a single circular arc that is convex outward.

In FIG. 4, an arrow Rft represents the radius of the circular arc that represents the contour of the reference surface FBL of the tread-forming surface 56 at the middle land surface-forming portion 68m. In the tire mold 48, the radius Rrm of the circular arc that represents the contour of the land surface-forming portion 68 can be smaller than the radius Rft of the circular arc that represents the contour of the reference surface FBL of the tread-forming surface 56. The end Pfn on the narrow projection 66n side of the land surface-forming portion 68 is located inward of the reference surface FBL of the tread-forming surface 56 in the radial direction. The end Pfw on the wide projection 66w side of the land surface-forming portion 68 is located radially inward of the reference surface FBL of the tread-forming surface 56.

In the production of the tire 2, by the cap portion 26 being pressed against the projections 66, the unvulcanized rubber for the cap portion 26 flows toward the portion between two projections 66, that is, the portion where the land portion 44 is to be formed. In the tire mold 48, the contour of the land surface-forming portion 68 is formed such that the ends Pfn and Pfw of the land surface-forming portion 68 are located inward of the reference surface FBL of the tread-forming surface 56. The volume of the unvulcanized rubber that flows to the portion where the land portion 44 is to be formed can be limited, and thus disturbance is less likely to occur in the flow of the unvulcanized rubber pressed against the projections 66. With the tire mold 48, the inner surface of the tread 4 can be formed in an appropriate shape without having disturbance. From this point of view, a drop distance represented as the distance from the reference surface FBL of the tread-forming surface 56 to the end of the land surface-forming portion 68 may be preferably not less than 0.01 mm. From the viewpoint of suppressing an increase in ground-contact pressure at a center portion of the land portion 44, the drop distance may be preferably not greater than 0.60 mm.

In FIG. 4, a double-headed arrow MDN represents the drop distance from the reference surface FBL of the tread-forming surface 56 to the end Pfn on the narrow projection 66n side of the land surface-forming portion 68. The drop distance MDN can be referred to or characterized as a narrow-side drop distance. A double-headed arrow MDW represents the drop distance from the reference surface FBL of the tread-forming surface 56 to the end Pfw on the wide projection 66w side of the land surface-forming portion 68. The drop distance MDW can be referred to or characterized as a wide-side drop distance.

The volume of the unvulcanized rubber pressed against the wide projection 66w can be larger than the volume of the unvulcanized rubber pressed against the narrow projection 66n. In this case, a difference can occur between the flow of the unvulcanized rubber on the wide projection 66w side and the flow of the unvulcanized rubber on the narrow projection 66n side, so that disturbance occurs in the inner surface shape of the tread 4, and the cord reinforcing layer 14 may become wavy depending on the degree of the disturbance.

However, in the tire mold 48, the wide-side drop distance MDW can be longer than the narrow-side drop distance MDN. In the tire mold 48, the volume of the unvulcanized rubber that flows to the portion where the land portion 44 is to be formed can be effectively limited on the wide projection 66w side. The flow of the unvulcanized rubber on the wide projection 66w side and the flow of the unvulcanized rubber on the narrow projection 66n side can be controlled in a well-balanced manner, and thus disturbance is less likely to occur or prevented in the flow of the unvulcanized rubber. With the tire mold 48, the inner surface of the tread 4 can be formed in an appropriate shape without having disturbance.

Figure 5:
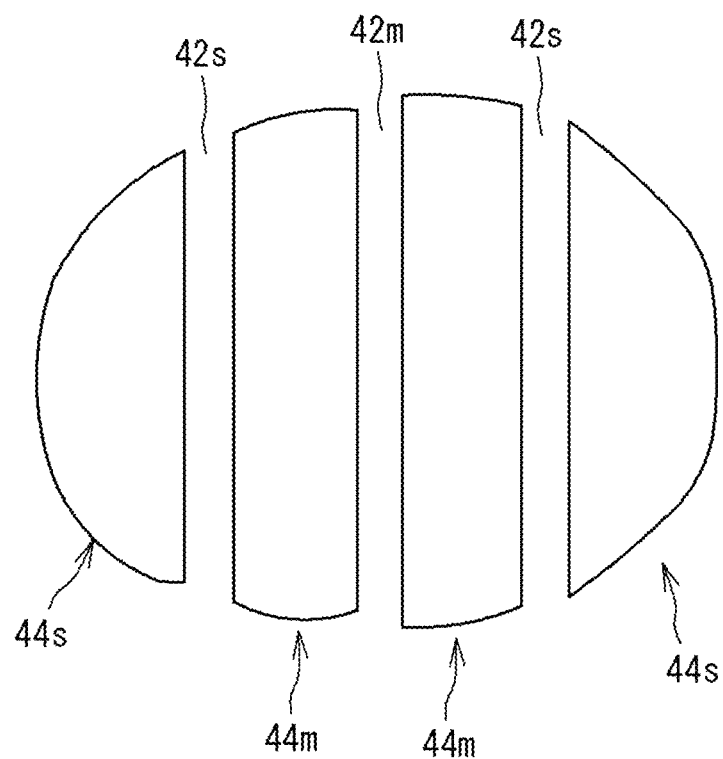
FIG. 5 is a schematic diagram showing an example of a ground-contact surface shape of a tire produced by a tire mold according to one or more embodiments of the present disclosure.

FIG. 5 shows an example of a ground-contact surface shape of the tire 2 (size=205/55R16) produced using the tire mold 48. In FIG. 5, the right-left direction corresponds to the axial direction of the tire 2. The up-down direction corresponds to the circumferential direction of the tire 2.

The ground-contact surface shape is obtained by tracing the contour of each land portion 44 on a ground-contact surface obtained by applying a load equal to the normal load to the tire 2 in the normal state and pressing the tire 2 against a road surface, using a tire ground-contact shape measuring device (not shown). To obtain the ground-contact surface, the tire 2 is placed such that the axial direction thereof is parallel to the road surface, and the above load is applied to the tire 2 in a direction perpendicular to the road surface. In the measuring device, the road surface is formed as a flat surface. In the measurement of the ground-contact surface, the tire 2 is pressed against the flat road surface.

As shown in FIG. 5, in the ground-contact surface shape of the tire 2 produced by the tire mold 48, the outer edge in the circumferential direction of the middle land portion 44m located between each shoulder circumferential groove 42s and the middle circumferential groove 42m does not have a shape that is convex inward as in the outer edge in the circumferential direction of each middle land portion confirmed for the tire produced by the conventional mold and shown in FIG. 9, but has a shape that bulges outward. The area of the ground-contact surface is clearly increased, so that the tire 2 can more sufficiently come into contact with a road surface than the tire produced by the conventional mold. With the tire mold 48, the steering stability of the tire 2 can be further improved.

Figure 6:
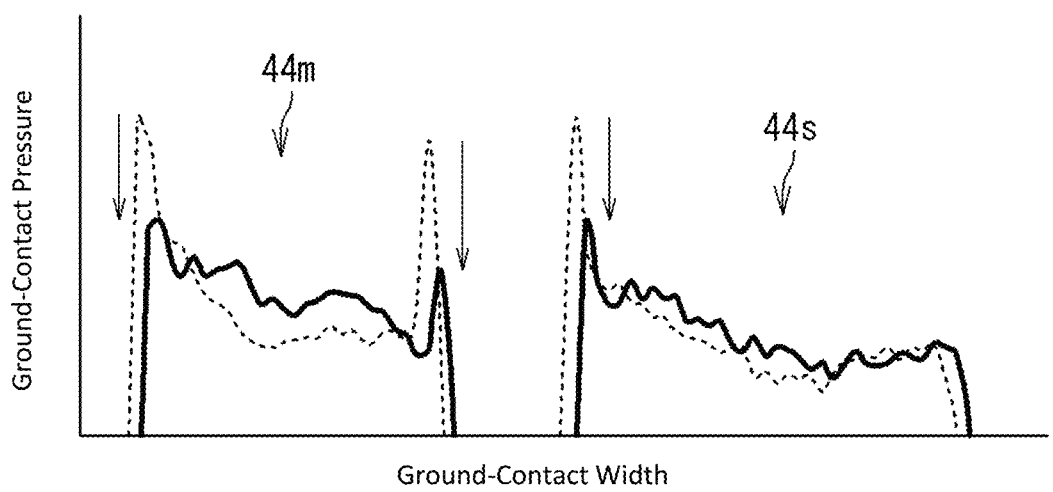
FIG. 6 is a graph showing an example of a ground-contact pressure distribution of the tire produced by a tire mold according to one or more embodiments of the present disclosure.

FIG. 6 shows an example of a ground-contact pressure distribution of the tire 2 (size=205/55R16) produced using the tire mold 48. The vertical axis represents ground-contact pressure, and the horizontal axis represents a position in the ground-contact width direction of the ground-contact surface. In FIG. 6, the right side shows a ground-contact pressure distribution of the shoulder land portion 44s, and the left side shows a ground-contact pressure distribution of the middle land portion 44m.

The ground-contact pressure distribution is obtained by applying a load equal to the normal load to the tire 2 in the normal state and pressing the tire 2 against a road surface, using a tire ground-contact pressure measuring device (not shown). To obtain the ground-contact surface, the tire 2 is placed such that the axial direction thereof is parallel to the road surface, and the above load is applied to the tire 2 in a direction perpendicular to the road surface. In the measuring device, the road surface is formed as a flat surface. In the measurement of the ground-contact pressure distribution, the tire 2 is pressed against the flat road surface. In FIG. 6, the ground-contact pressure distribution indicated by a dotted line is the ground-contact pressure distribution of the tire produced by the conventional mold such as shown in FIG. 10.

As shown in FIG. 6, in the ground-contact pressure distribution of the tire 2 produced by the tire mold 48, the increase in ground-contact pressure at each edge of the middle land portion 44m can be suppressed as compared to the increase in ground-contact pressure at each edge of the middle land portion confirmed for the tire produced by the conventional mold and shown in FIG. 10. In the example shown in FIG. 6, the ground-contact pressure difference in the middle land portion 44m can be reduced to about 50 kPa. The local increase in ground-contact pressure is clearly suppressed, so that the wear resistance of the tire 2 can be further improved with the tire mold 48.

With the tire mold 48 and the production method for the tire 2 using the tire mold 48, the ground-contact surface shape and the ground-contact pressure distribution of the tire 2 can be made appropriate, so that improvement of the steering stability and the wear resistance of the tire 2 can be achieved.

As described above, the groove width of each circumferential groove 42 provided on the tread 4 of the tire 2 may not be less than 9 mm. Therefore, in the tire mold 48, the width of each projection 66 for shaping the circumferential groove 42 can be set so as to be not less than 9 mm. The width of the projection 66 is represented as the distance from one corner to the other corner at the base of the projection 66. In the case where the corners of the projection 66 are rounded, the width of the projection 66 is specified on the basis of virtual corners obtained on the assumption that the corners are not rounded. In FIG. 4, a double-headed arrow MRN represents the width of the narrow projection 66n. A double-headed arrow MRW represents the width of the wide projection 66w.

In the tire mold 48, in the case where the width of each projection 66 is not less than 9 mm and not greater than 12 mm, preferably, the wide-side drop distance MDW can be longer than the narrow-side drop distance MDN, the narrow-side drop distance MDN can be not less than 0.01 mm, and the wide-side drop distance MDW can be not greater than 0.3 mm. Accordingly, the flow of the unvulcanized rubber on the wide projection 66w side and the flow of the unvulcanized rubber on the narrow projection 66n side can be controlled in a well-balanced manner, and thus disturbance is less likely to occur or prevented from occurring in the flow of the unvulcanized rubber. With the tire mold 48, the inner surface of the tread 4 can be formed in an appropriate shape without having disturbance. With the tire mold 48 and the production method for the tire 2 using the tire mold 48, the ground-contact surface shape and the ground-contact pressure distribution of the tire 2 can be made appropriate, so that improvement of the steering stability and the wear resistance of the tire 2 can be achieved.

In the tire mold 48, in the case where the width of each projection 66 is greater than 12 mm, preferably, the wide-side drop distance MDW can be longer than the narrow-side drop distance MDN, the narrow-side drop distance MDN can satisfy the following formula (MN1) represented using the width MRN of the narrow projection 66n, and the wide-side drop distance MDW can satisfy the following formula (MW1) represented using the width MRW of the wide projection 66w.

$$0.0344 \times MRW - 0.4094 \leq MDW \leq 0.0344 \times MRW - 0.1094 \quad \text{Formula (MW1)}$$

$$0.0344 \times MRN - 0.4094 \leq MDN \leq 0.0344 \times MRN - 0.1094 \quad \text{Formula (MN1)}$$

In the tire mold 48 as well, the flow of the unvulcanized rubber on the wide projection 66w side and the flow of the unvulcanized rubber on the narrow projection 66n side can be controlled in a well-balanced manner, and thus disturbance can be less likely to occur or prevented from occurring in the flow of the unvulcanized rubber. With the tire mold 48, the inner surface of the tread 4 can be formed in an appropriate shape without having disturbance. With the tire mold 48 and the production method for the tire 2 using the tire mold 48, the ground-contact surface shape and the ground-contact pressure distribution of the tire 2 can be made appropriate, so that improvement of the steering stability and the wear resistance of the tire 2 can be achieved.

[Contour of Shoulder Land Surface-Forming Portion 68s]

Figure 7:
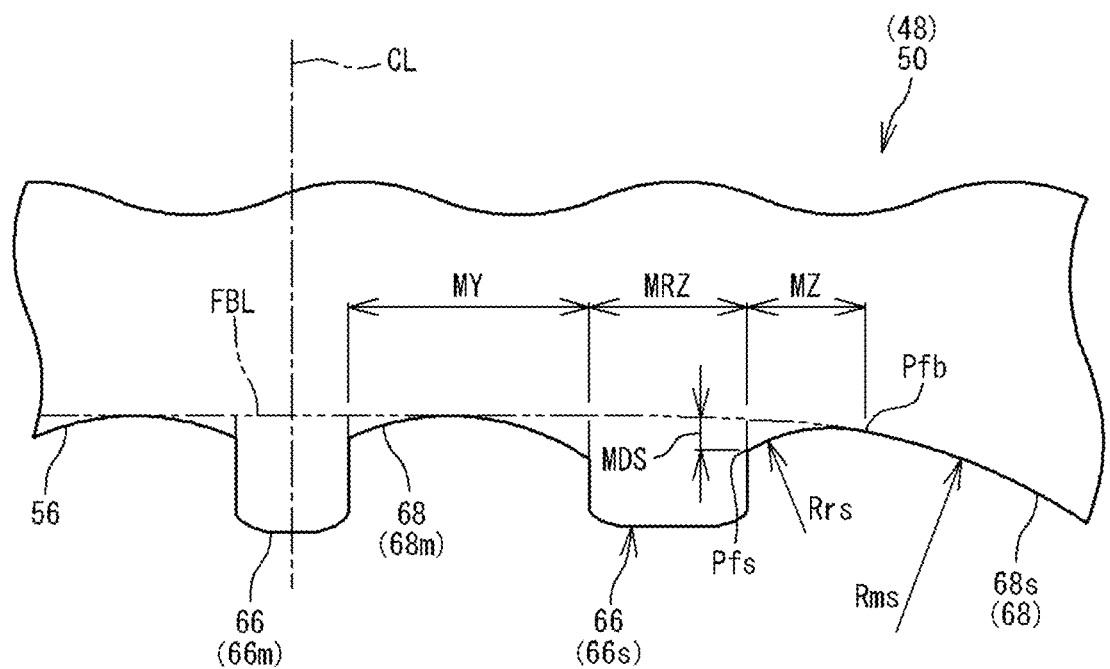
FIG. 7 is a cross-sectional view showing a part of the tire mold shown in FIG. 3.

FIG. 7 shows a cross-section of the tread ring 50 which forms a part of the tire mold 48 shown in FIG. 3. In FIG. 7, the contour of the tread-forming surface 56 for shaping the tread surface 22, which is the same as in FIG. 4, is schematically represented. The contour of the land surface-forming portion 68 located on the outer side in the axial direction, that is, the shoulder land surface-forming portion 68s, will be described on the basis of the contour of the shoulder land surface-forming portion 68s shown in FIG. 7.

The shoulder land surface-forming portion 68s can be the land surface-forming portion 68 located on the outer side in the axial direction among the at least three land surface-forming portions 68 included in the tread-forming surface 56. The land surface-forming portion 68 located inward of the shoulder land surface-forming portion 68s in the axial direction can be the middle land surface-forming portion 68m, and the projection 66 between the shoulder land surface-forming portion 68s and the middle land surface-forming portion 68m can be the shoulder projection 66s.

In FIG. 7, reference character Pfb represents the tangent point between the shoulder land surface-forming portion 68s and the reference surface FBL of the tread-forming surface 56 on the shoulder projection 66s side. Reference character Pfs represents the end on the shoulder projection 66s side of the shoulder land surface-forming portion 68s.

In the tire mold 48, when the tangent point Pfb is defined as a reference position, the contour of the portion from the end Pfs on the shoulder projection 66s side of the shoulder land surface-forming portion 68s to the reference position Pfb is represented by a single circular arc that is convex outward. In FIG. 7, an arrow Rrs represents the radius of the circular arc that represents the contour of the shoulder land surface-forming portion 68s. In the case where the contour configuration of the shoulder land surface-forming portion 68s is not clear, when the center position between the reference position Pfb and the end Pfs is specified, a circular arc passing through the reference position Pfb, the center position, and the end Pfs is drawn, and the maximum value of the distance between this circular arc and the contour is not greater than 0.03 mm, it is determined that the contour of the portion from the end Pfs on the shoulder projection 66s side of the shoulder land surface-forming portion 68s to the reference position Pfb is represented by a single circular arc that is convex outward.

In FIG. 7, an arrow Rms represents the radius of the circular arc that represents the contour of the reference surface FBL of the tread-forming surface 56 at the shoulder land surface-forming portion 68s. In the tire mold 48, the radius Rrs of the circular arc that represents the contour of the shoulder land surface-forming portion 68s can be smaller than the radius Rms of the circular arc that represents the contour of the reference surface FBL of the tread-forming surface 56. The end Pfs on the shoulder projection 66s side of the shoulder land surface-forming portion 68s is located inward of the reference surface FBL of the tread-forming surface 56 in the radial direction.

In the production of the tire 2, by the cap portion 26 being pressed against the projections 66, the unvulcanized rubber for the cap portion 26 flows toward the portion that is axially outward of each shoulder projection 66s, that is, the portion where the shoulder land portion 44s is to be formed. In the tire mold 48, the contour of the shoulder land surface-forming portion 68s can be formed such that the end Pfs of the shoulder land surface-forming portion 68s is located inward of the reference surface FBL of the tread-forming surface 56. The volume of the unvulcanized rubber that flows to the portion where the shoulder land portion 44s is to be formed can be limited, and thus disturbance is less likely to occur or prevented from occurring in the flow of the unvulcanized rubber pressed against the shoulder projection 66s. With the tire mold 48, the inner surface of the tread 4 can be formed in an appropriate shape without having disturbance.

As shown in FIG. 5, in the ground-contact surface shape of the tire 2 produced by the tire mold 48, the outer edge in the circumferential direction of each shoulder land portion 44s does not have a shape that is convex inward as in the outer edge in the circumferential direction of each shoulder land portion confirmed for the tire produced by the conventional mold and shown in FIG. 9, but has a shape that bulges outward. The area of the ground-contact surface is clearly increased, so that the tire 2 can more sufficiently come into contact with a road surface than the tire produced by the conventional mold. With the tire mold 48, the steering stability of the tire 2 can be further improved.

As shown in FIG. 6, in the ground-contact pressure distribution of the tire 2 produced by the tire mold 48, the increase in ground-contact pressure at each edge of the shoulder land portion 44s can be suppressed as compared to the increase in ground-contact pressure at each edge of the shoulder land portion confirmed for the tire produced by the conventional mold and shown in FIG. 10. In the example shown in FIG. 6, the ground-contact pressure difference in the shoulder land portion 44s can be reduced to about 150 kPa. The local increase in ground-contact pressure is clearly suppressed, so that the wear resistance of the tire 2 can be further improved with the mold 48.

With the tire mold 48 and the production method for the tire 2 using the tire mold 48, the ground-contact surface shape and the ground-contact pressure distribution of the tire 2 can be made appropriate, so that improvement of the steering stability and the wear resistance of the tire 2 can be achieved.

In FIG. 7, a double-headed arrow MY represents the width of the middle land surface-forming portion 68m. The width MY is represented as the distance from the corner on the middle land surface-forming portion 68m side of the middle projection 66m to the corner on the middle land surface-forming portion 68m side of the shoulder projection 66s. A double-headed arrow MZ represents the distance from the end Pfs on the shoulder projection 66s side of the shoulder land surface-forming portion 68s to the reference position Pfb. The distance MZ is represented as the distance from the corner on the shoulder land surface-forming portion 68s side of the shoulder projection 66s to the reference position Pfb.

In the tire mold 48, when the width of the middle land surface-forming portion 68m is denoted by MY, the distance MZ from the end Pfs on the shoulder projection 66s side of the shoulder land surface-forming portion 68s to the reference position Pfb can preferably satisfy the following formula (MS1).

$$(MY/2-5) \leq MZ \leq (MY/2+5) \quad \text{Formula (MS1)}$$

Accordingly, the volume of the unvulcanized rubber that flows to the portion where the shoulder land portion 44s is to be formed can be limited, and thus disturbance is less likely to occur or prevented from occuring in the flow of the unvulcanized rubber pressed against the shoulder projection 66s. With the tire mold 48, the inner surface of the tread 4 can be formed in an appropriate shape without having disturbance.

In FIG. 7, a double-headed arrow MDS represents a drop distance of the shoulder land surface-forming portion 68s. The drop distance MDS is represented as the distance from the reference surface FBL of the tread-forming surface 56 to the end Pfs of the shoulder land surface-forming portion 68s.

In the tire mold 48, from the viewpoint that disturbance is less likely to occur or prevented from occurring in the flow of the unvulcanized rubber pressed against the shoulder projection 66s and the inner surface of the tread 4 can be formed in an appropriate shape without having disturbance, the drop distance MDS represented as the distance from the reference surface FBL of the tread-forming surface 56 to the end Pfs of the shoulder land surface-forming portion 68s can be preferably not less than 0.05 mm. From the viewpoint of suppressing an increase in ground-contact pressure at a center portion of the shoulder land portion 44s, the drop distance MDS can be preferably not greater than 0.60 mm.

In FIG. 7, a double-headed arrow MRZ represents the width of the shoulder projection 66s. The width MRZ of the shoulder projection 66s is represented as the distance from one corner to the other corner at the base of the shoulder projection 66s.

In the tire mold 48, from the viewpoint that occurrence of disturbance in the flow of the unvulcanized rubber pressed against the shoulder projection 66s is effectively suppressed and the inner surface of the tread 4 can be formed in an appropriate shape without having disturbance, the drop distance MDS represented as the distance from the reference surface FBL of the tread-forming surface 56 to the end Pfs of the shoulder land surface-forming portion 68s can be preferably set in accordance with the magnitude of the width MRZ of the shoulder projection 66s. From this point of view, the drop distance MDS can more preferably satisfy the following formula (MZ1) represented using the width MRZ of the shoulder projection 66s.

$$MDS = 0.0344 \times MRZ - 0.2594 \quad \text{Formula (MZ1)}$$

In the tire mold 48, the flow of the unvulcanized rubber can be controlled on the basis of the contours of the shoulder land surface-forming portions 68s and the land surface-forming portions 68 each located between two projections 66. However, in the case where disturbance of the inner surface occurs at a center portion of the tread 4, the flow of the unvulcanized rubber may be controlled on the basis of the contours of the land surface-forming portions 68 each located between two projections 66, and, in the case where the disturbance of the inner surface occurs at shoulder portions of the tread 4, the flow of the unvulcanized rubber may be controlled on the basis of the contours of the shoulder land surface-forming portions 68s. From the viewpoint of making the ground-contact surface shape and the ground-contact pressure distribution of the tire 2 sufficiently appropriate, the flow of the unvulcanized rubber is preferably controlled on the basis of the contours of the shoulder land surface-forming portions 68s and the land surface-forming portions 68 each located between two projections 66.

The tire 2 shown in FIG. 1 can be produced using the above-described tire mold 48 having the tread-forming surface 56. Next, the contour of the tread surface 22 shaped by the tread-forming surface 56 will be described.

[Contour of Land Surface 46 Located Between Two Circumferential Grooves 42]

The contour of the land surface 46 located between two circumferential grooves 42 will be described on the basis of the contour of the middle land surface 46m shown in FIG. 2. The middle land surface 46m is located between the shoulder circumferential groove 42s and the middle circumferential groove 42m. As described above, the shoulder circumferential groove 42s can be the wide circumferential groove 42w, and the middle circumferential groove 42m can be the narrow circumferential groove 42n. The middle land surface 46m can be the land surface 46 located between the wide circumferential groove 42w and the narrow circumferential groove 42n.

As described above, the reference surface TBL of the tread surface 22 is tangent to the at least three land surfaces 46 included in the tread surface 22. In FIG. 2, reference character Ptm represents the tangent point between the reference surface TBL of the tread surface 22 and the land surface 46. Reference character Ptn represents the end on the narrow circumferential groove 42n side of the land surface 46. The end Ptn is the boundary between the land surface 46 and the narrow circumferential groove 42n. Reference character Ptw represents the end on the wide circumferential groove 42w side of the land surface 46. The end Ptw is the boundary between the land surface 46 and the wide circumferential groove 42w.

In the tire 2, the contour of the land surface 46 can be represented by a single circular arc that is convex outward. In FIG. 2, an arrow Rst represents the radius of the circular arc that represents the contour of the land surface 46. In the case where the contour configuration of the land surface 46 is not clear, when a circular arc passing through the boundary Ptn, the tangent point Ptm, and the boundary Ptw is drawn and the maximum value of the distance between this circular arc and the contour is not greater than 0.03 mm, it is determined that the contour of the land surface 46 is represented by a single circular arc that is convex outward.

In FIG. 2, an arrow Rmt represents the radius of the circular arc that represents the contour of the reference surface TBL of the tread surface 22 at the middle land surface 46m. In the tire mold 48, the radius Rst of the circular arc that represents the contour of the land surface 46 can be smaller than the radius Rmt of the circular arc that represents the contour of the reference surface TBL of the tread surface 22. The end Ptn on the narrow circumferential groove 42n side of the land surface 46 is located inward of the reference surface TBL of the tread surface 22 in the radial direction. The end Ptw on the wide circumferential groove 42w side of the land surface 46 is located radially inward of the reference surface TBL of the tread surface 22.

In the production of the tire 2, by the cap portion 26 being pressed against the projections 66, the unvulcanized rubber for the cap portion 26 flows toward the portion between two circumferential grooves 42, that is, the portion where the land portion 44 is to be formed. In the tire 2, the contour of the land surface 46 can be formed such that the ends Ptn and Ptw of the land surface 46 are located inward of the reference surface TBL of the tread surface 22. The volume of the unvulcanized rubber that flows to the portion where the land portion 44 is to be formed can be limited, and thus disturbance is less likely to occur or prevented from occurring in the flow of the unvulcanized rubber pressed against the projections 66. In the tire 2, the inner surface of the tread 4 can be formed in an appropriate shape without having disturbance. From this point of view, the drop distance represented as the distance from the reference surface TBL of the tread surface 22 to the end of the land surface 46 can be preferably not less than 0.01 mm. From the viewpoint of suppressing an increase in ground-contact pressure at the center portion of the land portion 44, the drop distance can be preferably not greater than 0.60 mm.

In FIG. 2, a double-headed arrow TDN represents the drop distance from the reference surface TBL of the tread surface 22 to the end Ptn on the narrow circumferential groove 42n side of the land surface 46. The drop distance TDN can be characterized or referred to as a narrow-side drop distance. A double-headed arrow TDW represents the drop distance from the reference surface TBL of the tread surface 22 to the end Ptw on the wide circumferential groove 42w side of the land surface 46. The drop distance TDW can be referred to or characterized as a wide-side drop distance.

The volume of the unvulcanized rubber pressed against the wide projection 66w can be larger than the volume of the unvulcanized rubber pressed against the narrow projection 66n. In this case, a difference can occur between the flow of the unvulcanized rubber on the wide projection 66w side and the flow of the unvulcanized rubber on the narrow projection 66n side, so that disturbance occurs in the inner surface shape of the tread 4, and the cord reinforcing layer 14 may become wavy depending on the degree of the disturbance.

However, in the tire 2, the wide-side drop distance TDW can be longer than the narrow-side drop distance TDN. In the tire 2, the volume of the unvulcanized rubber that flows to the portion where the land portion 44 is to be formed can be effectively limited on the wide projection 66w side. The flow of the unvulcanized rubber on the wide projection 66w side and the flow of the unvulcanized rubber on the narrow projection 66n side can be controlled in a well-balanced manner, and thus disturbance is less likely to occur or prevented from occuring in the flow of the unvulcanized rubber. In the tire 2, the inner surface of the tread 4 can be formed in an appropriate shape without having disturbance.

As described above, in the ground-contact surface shape of the tire 2 shown in FIG. 5, the outer edge in the circumferential direction of the middle land portion 44m located between each shoulder circumferential groove 42s and the middle circumferential groove 42m does not have a shape that is convex inward as in the outer edge in the circumferential direction of each middle land portion confirmed for the tire produced by the conventional mold and shown in FIG. 9, but can have a shape that bulges outward. The area of the ground-contact surface can thus be clearly increased, so that the tire 2 can more sufficiently come into contact with a road surface than the tire produced by the conventional mold. The steering stability of the tire 2 can be further improved.

As described above, in the ground-contact pressure distribution of the tire 2 shown in FIG. 6, the increase in ground-contact pressure at each edge of the middle land portion 44m can be suppressed as compared to the increase in ground-contact pressure at each edge of the middle land portion confirmed for the tire produced by the conventional mold and shown in FIG. 10. The local increase in ground-contact pressure can thus be clearly suppressed, so that the wear resistance of the tire 2 can be further improved.

In the tire 2, an appropriate ground-contact surface shape and an appropriate ground-contact pressure distribution can be obtained. The steering stability and the wear resistance of the tire 2 can be improved.

In the tire 2, in the case where the groove width of each circumferential groove 42 is not less than 9 mm and not greater than 12 mm, preferably, the wide-side drop distance TDW can be longer than the narrow-side drop distance TDN, the narrow-side drop distance TDN can be not less than 0.01 mm, and the wide-side drop distance TDW can be not greater than 0.3 mm. Accordingly, the flow of the unvulcanized rubber on the wide projection 66w side and the flow of the unvulcanized rubber on the narrow projection 66n side can be controlled in a well-balanced manner, and thus disturbance can be less likely to occur or prevented from occuring in the flow of the unvulcanized rubber. In the tire 2, the inner surface of the tread 4 can be formed in an appropriate shape without having disturbance. In the tire 2, an appropriate ground-contact surface shape and an appropriate ground-contact pressure distribution can be obtained, and thus improvement of steering stability and wear resistance can be achieved.

In FIG. 2, a double-headed arrow TRN represents the groove width of the narrow circumferential groove 42n. A double-headed arrow TRW represents the groove width of the wide circumferential groove 42w.

In the tire 2, in the case where the groove width of each circumferential groove 42 can be greater than 12 mm, preferably, the wide-side drop distance TDW can be longer than the narrow-side drop distance TDN, the narrow-side drop distance TDN can satisfy the following formula (TN1) represented using the groove width TRN of the narrow circumferential groove 42n, and the wide-side drop distance TDW can satisfy the following formula (TW1) represented using the groove width TRW of the wide circumferential groove 42w.

$$0.0344 \times TRW - 0.4094 \leq TDW \leq 0.0344 \times TRW - 0.1094 \quad \text{Formula (TW1)}$$

$$0.0344 \times TRN - 0.4094 \leq TDN \leq 0.0344 \times TRN - 0.1094 \quad \text{Formula (TN1)}$$

In the tire 2 as well, the flow of the unvulcanized rubber on the wide projection 66w side and the flow of the unvulcanized rubber on the narrow projection 66n side can be controlled in a well-balanced manner, and thus disturbance can be less likely to occur or prevented from occurring in the flow of the unvulcanized rubber. In the tire 2, the inner surface of the tread 4 can be formed in an appropriate shape without having disturbance. In the tire 2, an appropriate ground-contact surface shape and an appropriate ground-contact pressure distribution can be obtained, and thus improvement of steering stability and wear resistance can be achieved.

[Contour of Shoulder Land Surface 46s]

Figure 8:
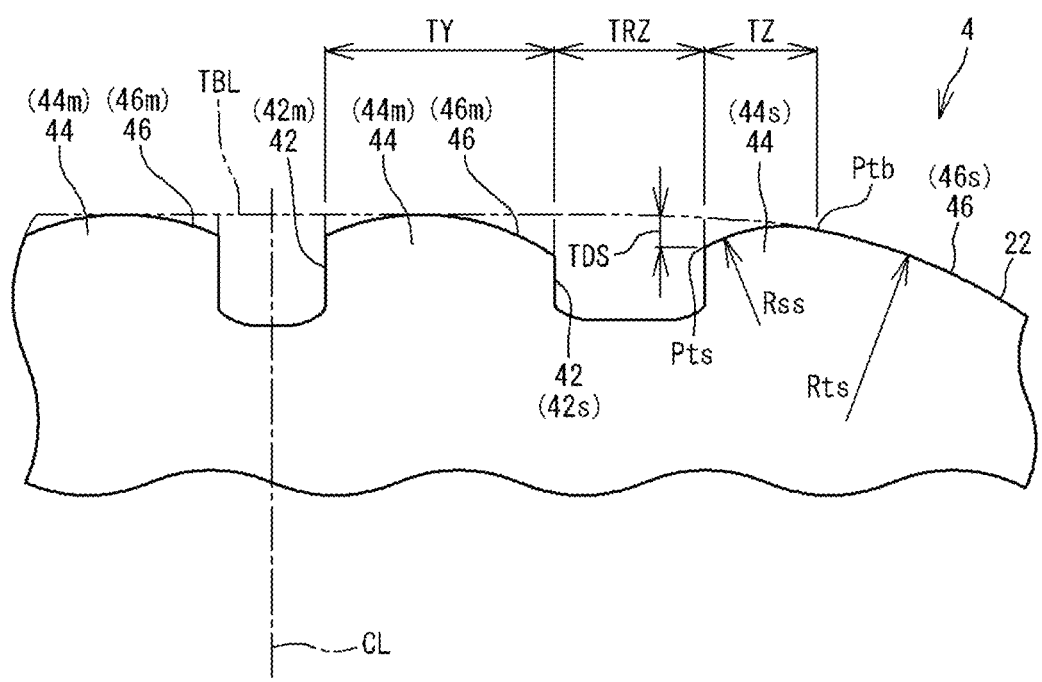
FIG. 8 is a cross-sectional view showing a part of the tire shown in FIG. 1.

FIG. 8 shows a cross-section of a portion of the tread 4 shown in FIG. 1. In FIG. 8, the contour of the tread surface 22 that is the same as in FIG. 2 is schematically represented. The contour of the land surface 46 located on the outer side in the axial direction, that is, the shoulder land surface 46s, will be described on the basis of the contour of the shoulder land surface 46s shown in FIG. 8.

The shoulder land surface 46s can be the land surface 46 located on the outer side in the axial direction among the at least three land surfaces 46 included in the tread surface 22. The land surface 46 located inward of the shoulder land surface 46s in the axial direction can be the middle land surface 46m, and the circumferential groove 42 between the shoulder land surface 46s and the middle land surface 46m can be the shoulder circumferential groove 42s.

In FIG. 8, reference character Ptb represents the tangent point between the shoulder land surface 46s and the reference surface TBL of the tread surface 22 on the shoulder circumferential groove 42s side. Reference character Pts represents the end on the shoulder circumferential groove 42s side of the shoulder land surface 46s.

In the tire 2, when the tangent point Ptb is defined as a reference position, the contour of the portion from the end Pts on the shoulder circumferential groove 42s side of the shoulder land surface 46s to the reference position Ptb can be represented by a single circular arc that is convex outward. In FIG. 8, an arrow Rss represents the radius of the circular arc that represents the contour of the shoulder land surface 46s. In the case where the contour configuration of the shoulder land surface 46s is not clear, when the center position between the reference position Ptb and the end Pts is specified, a circular arc passing through the reference position Ptb, the center position, and the end Pts is drawn, and the maximum value of the distance between this circular arc and the contour is not greater than 0.03 mm, it is determined that the contour of the portion from the end Pts on the shoulder circumferential groove 42s side of the shoulder land surface 46s to the reference position Ptb is represented by a single circular arc that is convex outward.

In FIG. 8, an arrow Rts represents the radius of the circular arc that represents the contour of the reference surface TBL of the tread surface 22 at the shoulder land surface 46s. In the tire 2, the radius Rss of the circular arc that represents the contour of the shoulder land surface 46s can be smaller than the radius Rts of the circular arc that represents the contour of the reference surface TBL of the tread surface 22. The end Pts on the shoulder circumferential groove 42s side of the shoulder land surface 46s is located inward of the reference surface TBL of the tread surface 22 in the radial direction.

In the production of the tire 2, by the cap portion 26 being pressed against each shoulder projection 66s, the unvulcanized rubber for the cap portion 26 flows toward the portion that is axially outward of each shoulder projection 66s, that is, the portion where the shoulder land portion 44s is to be formed. In the tire 2, the contour of the shoulder land surface 46s can be formed such that the end Pts of the shoulder land surface 46s is located inward of the reference surface TBL of the tread surface 22. The volume of the unvulcanized rubber that flows to the portion where the shoulder land portion 44s is to be formed can be limited, and thus disturbance is less likely to occur or prevented from occurring in the flow of the unvulcanized rubber pressed against the shoulder projection 66s. In the tire 2, the inner surface of the tread 4 can be formed in an appropriate shape without having disturbance.

As described above, in the ground-contact surface shape of the tire 2 shown in FIG. 5, the outer edge in the circumferential direction of each shoulder land portion 44s does not have a shape that is convex inward as in the outer edge in the circumferential direction of each shoulder land portion confirmed for the tire produced by the conventional mold and shown in FIG. 9, but can have a shape that bulges outward. The area of the ground-contact surface can thus be clearly increased, so that the tire 2 can more sufficiently come into contact with a road surface than the tire produced by the conventional mold. The steering stability of the tire 2 can be further improved.

As described above, in the ground-contact pressure distribution of the tire 2 shown in FIG. 6, the increase in ground-contact pressure at each edge of the shoulder land portion 44s can be suppressed as compared to the increase in ground-contact pressure at each edge of the shoulder land portion confirmed for the tire produced by the conventional mold and shown in FIG. 10. The local increase in ground-contact pressure can thus be clearly suppressed, so that the wear resistance of the tire 2 can be further improved.

In the tire 2, an appropriate ground-contact surface shape and an appropriate ground-contact pressure distribution can be obtained. The steering stability and the wear resistance of the tire 2 can be improved.

In FIG. 8, a double-headed arrow TY represents the width of the middle land surface 46m. The width TY is represented as the distance from one edge of the middle land portion 44m to the other edge of the middle land portion 44m. A double-headed arrow TZ represents the distance from the end Pts on the shoulder circumferential groove 42s side of the shoulder land surface 46s to the reference position Ptb. The distance TZ is represented as the distance from the edge of the shoulder land portion 44s to the reference position Ptb.

In the tire 2, when the width of the middle land surface 46m is denoted by TY, the distance TZ from the end Pts on the shoulder circumferential groove 42s side of the shoulder land surface 46s to the reference position Ptb can preferably satisfy the following formula (TS1).

$$(TY/2-5) \le TZ \le (TY/2+5) \quad \text{Formula (TS1)}$$

Accordingly, the volume of the unvulcanized rubber that flows to the portion where the shoulder land portion 44s is to be formed can be limited, and thus disturbance is less likely to occur or prevented from occurring in the flow of the unvulcanized rubber pressed against the shoulder projection 66s. In the tire 2, the inner surface of the tread 4 can be formed in an appropriate shape without having disturbance.

In FIG. 8, a double-headed arrow TDS represents a drop distance of the shoulder land surface 46s. The drop distance TDS is represented as the distance from the reference surface TBL of the tread surface 22 to the end Pts of the shoulder land surface 46s.

In the tire 2, from the viewpoint that disturbance is less likely to occur or prevented from occurring in the flow of the unvulcanized rubber pressed against the shoulder projection 66s and the inner surface of the tread 4 can be formed in an appropriate shape without having disturbance, the drop distance TDS represented as the distance from the reference surface TBL of the tread surface 22 to the end Pts of the shoulder land surface 46s can be preferably not less than 0.05 mm. From the viewpoint of suppressing an increase in ground-contact pressure at the center portion of the shoulder land portion 44s, the drop distance TDS can be preferably not greater than 0.60 mm.

In FIG. 8, a double-headed arrow TRZ represents the groove width of the shoulder circumferential groove 42s. The groove width TRZ of the shoulder circumferential groove 42s is represented as the distance from the edge on the shoulder circumferential groove 42s side of the middle land portion 44m to the edge of the shoulder land portion 44s.

In the tire 2, from the viewpoint that occurrence of disturbance in the flow of the unvulcanized rubber pressed against the shoulder projection 66s can be effectively suppressed and the inner surface of the tread 4 can be formed in an appropriate shape without having disturbance, the drop distance TDS represented as the distance from the reference surface TBL of the tread surface 22 to the end Pts of the shoulder land surface 46s can be preferably set in accordance with the magnitude of the groove width TRZ of the shoulder circumferential groove 42s. From this point of view, the drop distance TDS can more preferably satisfy the following formula (TZ1) represented using the groove width TRZ of the shoulder circumferential groove 42s.

$$TDS = 0.0344 \times TRW - 0.2594 \quad \text{Formula (TZ1)}$$

In the tire 2, the flow of the unvulcanized rubber can be controlled on the basis of the contours of each shoulder land surface 46s and the land surfaces 46 each located between two circumferential grooves 42. However, in the case where disturbance of the inner surface occurs at the center portion of the tread 4, the flow of the unvulcanized rubber may be controlled on the basis of the contours of the land surfaces 46 each located between two circumferential grooves 42, and, in the case where disturbance of the inner surface occurs at the shoulder portions of the tread 4, the flow of the unvulcanized rubber may be controlled on the basis of the contour of each shoulder land surface 46s. From the viewpoint of making the ground-contact surface shape and the ground-contact pressure distribution of the tire 2 sufficiently appropriate, the flow of the unvulcanized rubber can be preferably controlled on the basis of the contours of each shoulder land surface 46s and the land surfaces 46 each located between two circumferential grooves 42.

As described above, with the tire mold 48 and the production method for a tire according to the present disclosure, the ground-contact surface shape and the ground-contact pressure distribution of the tire 2 can be made appropriate. In the tire 2 obtained by the tire mold 48 and the production method for a tire, an appropriate ground-contact surface shape and an appropriate ground-contact pressure distribution can be obtained, and thus steering stability and wear resistance can be improved.

As described above, the projections 66 on the tread-forming surface 56 press the cap portion 26. As an example, the present disclosure exhibits a remarkable effect in the case where the unvulcanized rubber for the cap portion 26 has a Mooney viscosity of not less than 80. The Mooney viscosity means a Mooney viscosity $ML_{1+4}(100° C.)$ and is measured according to JIS K6300-1.

The above-described technology to make the ground-contact surface shape and the ground-contact pressure distribution of the tire appropriate can also be applied to various tires.

Preferably, in the tire mold,
in a case where a width of each projection is not less than 9 mm and not greater than 12 mm, the narrow-side drop distance MDN is not less than 0.01 mm, and the wide-side drop distance MDW is not greater than 0.3 mm, and
in a case where the width of each projection is greater than 12 mm, the narrow-side drop distance MDN satisfies the following formula (MN1) represented using a width MRN of the narrow projection, and the wide-side drop distance MDW satisfies the following formula (MW1) represented using a width MRW of the wide projection.

$$0.0344 \times MRW - 0.4094 \le MDW \le 0.0344 \times MRW - 0.1094 \quad \text{Formula (MW1)}$$

$$0.0344 \times MRN - 0.4094 \le MDN \le 0.0344 \times MRN - 0.1094 \quad \text{Formula (MN1)}$$

Preferably, in the tire mold, when a width of the middle land surface-forming portion is denoted by MY, a distance MZ from the end on the shoulder projection side to the reference position satisfies the following formula (MS1).

$$(MY/2-5) \le MZ \le (MY/2+5) \quad \text{Formula (MS1)}$$

Preferably, in the tire mold, a shoulder-side drop distance MDS that is a distance from the reference surface of the tread-forming surface to the end on the shoulder projection side of the shoulder land surface-forming portion is not less than 0.05 mm and not greater than 0.6 mm.

Preferably, in the tire mold, the tread includes a cap portion including the tread surface, and an unvulcanized rubber for the cap portion has a Mooney viscosity of not less than 80.

A production method for a tire according to an aspect of the present disclosure includes a step of pressurizing and heating a green tire using any of the tire molds described above.

A tire according to an aspect of the present disclosure includes a tread having a tread surface that comes into contact with a road surface, at least two circumferential grooves having a groove width of not less than 9 mm are formed on the tread so as to extend in a circumferential direction, thereby forming at least three land portions in the tread, and the tread surface includes the at least two circumferential grooves and at least three land surfaces that are outer surfaces of the at least three land portions. In the tire, a contour of a land surface located between two circumferential grooves among the at least three land surfaces is represented by a single circular arc that is convex outward. In a case where, of the two circumferential grooves, one circumferential groove is a wide circumferential groove having a larger groove width than the other circumferential groove, and the other circumferential groove is a narrow circumferential groove having a smaller groove width than the one circumferential groove, when a surface that has a contour represented by at least one circular arc and that is tangent to the at least three land surfaces is defined as a reference surface of the tread surface, a wide-side drop distance TDW that is a distance from the reference surface of the tread surface to an end on the wide circumferential groove side of the land surface is longer than a narrow-side drop distance TDN that is a distance from the reference surface of the tread surface to an end on the narrow circumferential groove side of the land surface.

A tire according to another aspect of the present disclosure includes a tread having a tread surface that comes into contact with a road surface, at least two circumferential grooves having a groove width of not less than 9 mm are formed on the tread so as to extend in a circumferential direction, thereby forming at least three land portions in the tread, and the tread surface includes the at least two circumferential grooves and at least three land surfaces that are outer surfaces of the at least three land portions. In the tire, among the at least three land surfaces, a land surface located on each outer side in an axial direction is a shoulder land surface, a land surface located inward of the shoulder land surface is a middle land surface, and a circumferential groove between the shoulder land surface and the middle land surface is a shoulder circumferential groove. When a surface that has a contour represented by at least one circular arc and that is tangent to the at least three land surfaces is defined as a reference surface of the tread surface, and a tangent point between the shoulder land surface and the reference surface of the tread surface on the shoulder circumferential groove side is defined as a reference position, a contour of a portion from an end on the shoulder circumferential groove side of the shoulder land surface to the reference position is represented by a single circular arc.

With the tire mold and the production method for a tire according to the present disclosure, the ground-contact surface shape and the ground-contact pressure distribution of a tire can be made appropriate. In a tire obtained by the tire mold and the production method for a tire, an appropriate ground-contact surface shape and an appropriate ground-contact pressure distribution are obtained, and thus steering stability and wear resistance can be improved.

What is claimed is:

1. A tire mold to produce a tire including a tread having a tread surface that comes into contact with a road surface, at least two circumferential grooves having a groove width of not less than 9 mm being formed on the tread so as to extend in a circumferential direction, thereby forming at least three land portions in the tread, the tread surface including the at least two circumferential grooves and at least three land surfaces that are outer surfaces of the at least three land portions, the tire mold comprising:
   a tread-forming surface to shape the tread surface, wherein
   the tread-forming surface includes at least two projections to respectively form the at least two circumferential grooves, and at least three land surface-forming portions to respectively form the at least three land surfaces,
   a contour of a land surface-forming portion between two projections among the at least three land surface-forming portions is represented by a single, continuous circular arc that is convex outward in a radial direction,
   of the two projections, a first projection is a wide projection having a larger width than a second projection, and the second projection is a narrow projection having a smaller width than the first projection,
   a surface that is tangent to the at least three land surface-forming portions is defined as a reference surface of the tread-forming surface, and
   a wide-side drop distance, which is a first distance, in the radial direction, from the reference surface of the tread-forming surface to a first end of the contour of the land surface-forming portion between the two projections on a wide projection side, is greater than a narrow-side drop distance, which is a second distance, in the radial direction, from the reference surface of the tread-forming surface to a second end of the contour of the land surface-forming portion between the two projections on a narrow projection side.

2. The tire mold according to claim 1, wherein
   a width of each projection is not less than 9 mm and not greater than 12 mm, the narrow-side drop distance is not less than 0.01 mm, and the wide-side drop distance is not greater than 0.3 mm, the width of each projection is greater than 12 mm, the narrow-side drop distance satisfies the following formula (MN1) represented using a width of the narrow projection, and the wide-side drop distance satisfies the following formula (MW1) represented using a width of the wide projection, $$0.0344 \times MRW - 0.4094 < MDW < 0.0344 \times MRW - 0.1094 \quad \text{formula (MW1)},$$

$$0.0344 \times MRN - 0.4094 < MDN < 0.0344 \times MRN - 0.1094 \quad \text{formula (MN1)}.$$

3. The tire mold according to claim 1, wherein the tire mold is adapted to produce the tire whereby:
   the tread includes a cap portion including the tread surface, and
   an unvulcanized rubber for the cap portion has a Mooney viscosity of not less than 80.

4. The tire mold according to claim 1, wherein the tire mold is adapted to accommodate pressure and heating to produce the tire.

5. A tire mold to produce a tire including a tread having a tread surface that comes into contact with a road surface, at least two circumferential grooves having a groove width of not less than 9 mm being formed on the tread so as to extend in a circumferential direction, thereby forming at least three land portions in the tread, the tread surface including the at least two circumferential grooves and at least three land surfaces that are outer surfaces of the at least three land portions, the tire mold comprising:

a tread-forming surface to shape the tread surface, wherein the tread-forming surface includes at least two projections to respectively form the at least two circumferential grooves, and at least three land surface-forming portions to respectively form the at least three land surfaces, among the at least three land surface-forming portions, a first land surface-forming portion located on an outer side in an axial direction is a shoulder land surface-forming portion, a second land surface-forming portion located inward of the shoulder land surface-forming portion is a middle land surface-forming portion, and a projection between the shoulder land surface-forming portion and the middle land surface-forming portion is a shoulder projection, a surface that is tangent to the at least three land surface-forming portions is defined as a reference surface of the tread-forming surface, and a tangent point shared by the shoulder land surface-forming portion and the reference surface of the tread-forming surface on a shoulder projection side is defined as a first reference position on the reference surface, a first contour of a first portion from an end of the first contour on the shoulder projection side of said shoulder land surface-forming portion to the first reference position is represented by a first single, continuous circular arc that is convex outward in a radial direction, a second contour of a second portion from an end of the second contour to a second reference position on the reference surface is represented by a second single, continuous circular arc that is convex outward in the radial direction, and a first distance, in the radial direction, from the reference surface of the tread-forming surface to the end of the first contour is greater than a second distance, in the radial direction, from the reference surface of the tread-forming surface to the end of the second contour.

6. The tire mold according to claim 5, wherein, when a width of the middle land surface-forming portion is denoted by MY, a distance MZ from the end on the shoulder projection side to the reference position satisfies the following formula (MS1), $(MY/2-5)<MZ<(MY/2+5)$     formula (MS1).

7. The tire mold according to claim 6, wherein a shoulder-side drop distance MDS that is a distance from the reference surface of the tread-forming surface to the end on the shoulder projection side of said one shoulder land surface-forming portion is not less than 0.05 mm and not greater than 0.6 mm.

8. The tire mold according to claim 5, wherein a shoulder-side drop distance MDS that is a distance from the reference surface of the tread-forming surface to the end on the shoulder projection side of said one shoulder land surface-forming portion is not less than 0.05 mm and not greater than 0.6 mm.

9. The tire mold according to claim 5, wherein the tire mold is adapted to produce the tire whereby:

the tread includes a cap portion including the tread surface, and an unvulcanized rubber for the cap portion has a Mooney viscosity of not less than 80.

10. The tire mold according to claim 5, wherein the end of the second contour is at or inward in an axial direction of the middle land surface-forming portion.

11. A production method for a tire including a tread having a tread surface that comes into contact with a road surface, at least two circumferential grooves having a groove width of not less than 9 mm being formed on the tread so as to extend in a circumferential direction, thereby forming at least three land portions in the tread, the tread surface including the at least two circumferential grooves and at least three land surfaces that are outer surfaces of the at least three land portions, the production method comprising:

providing tire material in a tire mold; and pressurizing and heating the tire material in the tire mold, wherein the tire mold includes a tread-forming surface to shape the tread surface, wherein the tread-forming surface includes at least two projections to respectively form the at least two circumferential grooves, and at least three land surface-forming portions to respectively form the at least three land surfaces, wherein a contour of a land surface-forming portion between two projections among the at least three land surface-forming portions is represented by a single, continuous circular arc that is convex outward in a radial direction, of the two projections, a first projection is a wide projection having a larger width than a second projection, and the second projection is a narrow projection having a smaller width than the first projection, wherein a surface that is tangent to the at least three land surface-forming portions is defined as a reference surface of the tread-forming surface, and wherein a wide-side drop distance, which is a first distance, in the radial direction, from the reference surface of the tread-forming surface to a first end of the contour of the land surface-forming portion between the two projections on a wide projection side, is greater than a narrow-side drop distance, which is a second distance, in the radial direction, from the reference surface of the tread-forming surface to a second end of the contour of the land surface-forming portion between the two projections on a narrow projection side.

* * * * *